United States Patent
Joo

(10) Patent No.: US 11,554,325 B2
(45) Date of Patent: Jan. 17, 2023

(54) APPARATUS AND METHOD FOR PROVIDING GAME SERVICE

(71) Applicant: NETMARBLE CORPORATION, Guro-Gu Seoul (KR)

(72) Inventor: Sung Il Joo, Guro-Gu Seoul (KR)

(73) Assignee: NETMARBLE CORPORATION, Seoul (KR)

( * ) Notice: Subject to any disclaimer, the term of this patent is extended or adjusted under 35 U.S.C. 154(b) by 254 days.

(21) Appl. No.: 16/645,575

(22) PCT Filed: Sep. 21, 2018

(86) PCT No.: PCT/KR2018/011246
§ 371 (c)(1),
(2) Date: Mar. 9, 2020

(87) PCT Pub. No.: WO2019/059712
PCT Pub. Date: Mar. 28, 2019

(65) Prior Publication Data
US 2020/0282316 A1 Sep. 10, 2020

(30) Foreign Application Priority Data
Sep. 25, 2017 (KR) .................. 10-2017-0123679

(51) Int. Cl.
*A63F 13/792* (2014.01)
*G06T 7/246* (2017.01)
(Continued)

(52) U.S. Cl.
CPC ............ *A63F 13/792* (2014.09); *G05B 15/02* (2013.01); *G06Q 20/123* (2013.01);
(Continued)

(58) Field of Classification Search
CPC .... A63F 13/792; A63F 13/213; A63F 13/428; A63F 13/56; A63F 13/63;
(Continued)

(56) References Cited

U.S. PATENT DOCUMENTS

| 8,151,199 B2 * | 4/2012 | Gerson | ................. H04L 67/131 705/50 |
| 8,348,767 B2 * | 1/2013 | Mahajan | ................. A63F 13/60 463/42 |

(Continued)

FOREIGN PATENT DOCUMENTS

| JP | 2002058045 A | 2/2002 |
| KR | 100883929 B1 | 2/2009 |

(Continued)

OTHER PUBLICATIONS

George, C., Khamis, M., von Zezschwitz, E., Burger, M., Schmidt, H., Alt, F. and Hussmann, H. (2017) Seamless and Secure VR: Adapting and Evaluating Established Authentication Systems for Virtual Reality. Network and Distributed System Security Symposium (NDSS 2017), San Diego, CA, USA, Feb. 26, 2001 (Year: 2017).*

(Continued)

*Primary Examiner* — Michael Jared Walker
(74) *Attorney, Agent, or Firm* — Boyle Fredrickson S.C.

(57) ABSTRACT

A method for providing a game service and a server for performing the same are disclosed. A method by which a server provides a game service can comprise the steps of: receiving image data including motion data from a user terminal; generating skill motion sequence data of a game character corresponding to the motion data; and adjusting a skill motion of the game character on the basis of the generated skill motion sequence data.

8 Claims, 5 Drawing Sheets

(51) Int. Cl.
*G05B 15/02* (2006.01)
*G06Q 20/12* (2012.01)
*G06Q 30/02* (2012.01)
*G06Q 30/06* (2012.01)
*H04L 67/131* (2022.01)

(52) U.S. Cl.
CPC ..... *G06Q 30/0209* (2013.01); *G06Q 30/0215* (2013.01); *G06Q 30/0637* (2013.01); *G06T 7/251* (2017.01); *H04L 67/131* (2022.05)

(58) Field of Classification Search
CPC .... A63F 2300/609; A63F 13/69; A63F 13/55; G05B 15/02; G06Q 20/123; G06Q 30/0209; G06Q 30/0215; G06Q 30/0637; G06Q 50/10; G06T 7/251; G06T 2207/20044; G06T 7/246; H04L 67/131; G07F 17/32; G07F 17/3225; G07F 17/3286

See application file for complete search history.

(56) References Cited

U.S. PATENT DOCUMENTS

| | | | | |
|---|---|---|---|---|
| 8,813,100 B1* | 8/2014 | Platzer | ................ | G06F 3/04845 719/328 |
| 8,836,707 B2* | 9/2014 | Platzer | ................ | G06F 3/04883 345/475 |
| 8,961,302 B2* | 2/2015 | Justice | ................... | A63F 13/48 463/29 |
| 9,037,564 B2* | 5/2015 | Lesavich | ................ | H04W 4/60 707/706 |
| 9,137,250 B2* | 9/2015 | Lesavich | ............... | G06F 16/951 |
| 9,361,479 B2* | 6/2016 | Lesavich | ................ | G09C 5/00 |
| 9,381,432 B2* | 7/2016 | Justice | ................... | A63F 13/355 |
| 9,526,980 B2* | 12/2016 | Karamfilov | ........... | A63F 13/215 |
| 9,564,102 B2* | 2/2017 | Justice | ................... | A63F 13/12 |
| 9,566,514 B2* | 2/2017 | Saito | ....................... | A63F 13/35 |
| 9,569,771 B2* | 2/2017 | Lesavich | ............... | H04L 63/102 |
| 9,694,277 B2* | 7/2017 | Justice | ................... | A63F 13/12 |
| 9,717,982 B2* | 8/2017 | Quinn | ................... | A63F 13/25 |
| 9,721,239 B1* | 8/2017 | Ho | ....................... | H04L 67/306 |
| 9,842,164 B2* | 12/2017 | Lee | ........................ | G06F 16/95 |
| 10,210,700 B2* | 2/2019 | Metelko | .............. | G07F 17/3272 |
| 10,322,339 B2* | 6/2019 | Metelko | .................. | G06T 15/20 |
| 10,579,571 B2* | 3/2020 | Saito | .................. | G06F 13/4221 |
| 2002/0024517 A1* | 2/2002 | Yamaguchi | ............. | G06T 7/593 348/E13.071 |
| 2008/0004118 A1* | 1/2008 | Van Luchene | ......... | G07F 17/32 463/42 |
| 2008/0004119 A1* | 1/2008 | Van Luchene | .......... | A63F 13/63 463/42 |
| 2008/0024523 A1* | 1/2008 | Tomite | .................. | G06T 19/006 345/632 |
| 2008/0300055 A1* | 12/2008 | Lutnick | ................ | G06V 40/107 463/39 |
| 2011/0148864 A1* | 6/2011 | Lee | ......................... | G06V 40/16 345/419 |
| 2011/0298827 A1* | 12/2011 | Perez | ..................... | G06V 40/28 345/647 |
| 2015/0018094 A1* | 1/2015 | Watari | .................. | A63F 13/355 463/31 |
| 2021/0182779 A1* | 6/2021 | Altieri | .................. | G06Q 10/087 |
| 2021/0394053 A1* | 12/2021 | Kanaya | .................. | A63F 13/355 |
| 2021/0394054 A1* | 12/2021 | Kanaya | .................. | A63F 13/86 |

FOREIGN PATENT DOCUMENTS

| | | |
|---|---|---|
| KR | 101014852 B1 | 2/2011 |
| KR | 1020150089980 A | 8/2015 |

OTHER PUBLICATIONS

Mar. 2017. ISBN 9781891562471 (doi:10.14722/usec.2017.23028), <http://eprints.gla.ac.uk/170218/1/170218.pdf> (Year: 2017).*

International Search Report of the Korean Intellectual Property Office, application PCT/KR2018/011246, dated Dec. 24, 2018, pp. 2.

* cited by examiner

APPARATUS AND METHOD FOR PROVIDING GAME SERVICE

TECHNICAL FIELD

The following description relates to an apparatus and method for providing a game service.

BACKGROUND ART

In a game service, a skill motion of a game character is performed in a manner defined when a game developer develops a game. Thus, because a motion of the same form is performed with respect to the same skill of the same character without regard to a user who plays a game, it is difficult to reflect the personality of the user through the skill motion of the game character. The game service provides an environment in which a game user is able to project his or her own personality through a combination of items worn by a game character, but the item worn by the game character is merely an item previously defined by the developer.

DISCLOSURE OF INVENTION

Technical Solution

According to an aspect of the present invention, there is provided a method for providing a game service in a server including receiving image data including motion data from a user terminal, generating skill motion sequence data of a game character corresponding to the motion data, and adjusting a skill motion of the game character based on the generated skill motion sequence data.

In the method for providing the game service in the server according to an embodiment, the generating of the skill motion sequence data may include extracting a skeleton for an entity of the motion data, extracting location data for a feature point of the extracted skeleton, and generating the skill motion sequence data based on a change in the location data of the feature point.

In the method for providing the game service in the server according to an embodiment, the skill motion sequence data may further include skill effect data corresponding to the skill motion, determined based on a control signal of the user terminal. The skill effect data may include at least one of data on a type of a skill effect, data on a time point when the skill effect occurs, or data on a location where the skill effect occurs.

According to another aspect of the present invention, there is provided a server for providing a game service including generating a skill motion item associated with a skill motion of a game character based on image data including motion data, received from a user terminal of a first user, providing the user terminal with image data for the game character to which the skill motion item is applied, when receiving a purchase request for the skill motion item from the user terminal, determining whether to approve the purchase request, and, when the purchase request is approved, storing the skill motion item in an item inventory of an account of the user terminal on a game service.

According to another aspect of the present invention, there is provided a server for providing a game service including a communication unit to perform communication with a user terminal and a processor. The processor may extract a skeleton for an entity of motion data from image data including the motion data, received from the user terminal, may generate skill motion sequence data of a game character based on a change in motion of the skeleton, and may provide a game service in which the game character is represented based on the generated skill motion sequence data.

In the server for providing the game service, when the communication unit receives a request to generate a skill motion item associated with a skill motion of a game character from a user terminal of a first user, the processor may generate the skill motion item based on image data received from the user terminal of the first user, may provide the user terminal of the first user with image data for the game character to which the skill motion item is applied, when receiving a purchase request for the skill motion item from the user terminal of the first user, may determine whether to approve the purchase request, and, when the purchase request is approved, may store the skill motion item in an item inventory of an account of the first user.

BEST MODE FOR CARRYING OUT THE INVENTION

Figure 1:
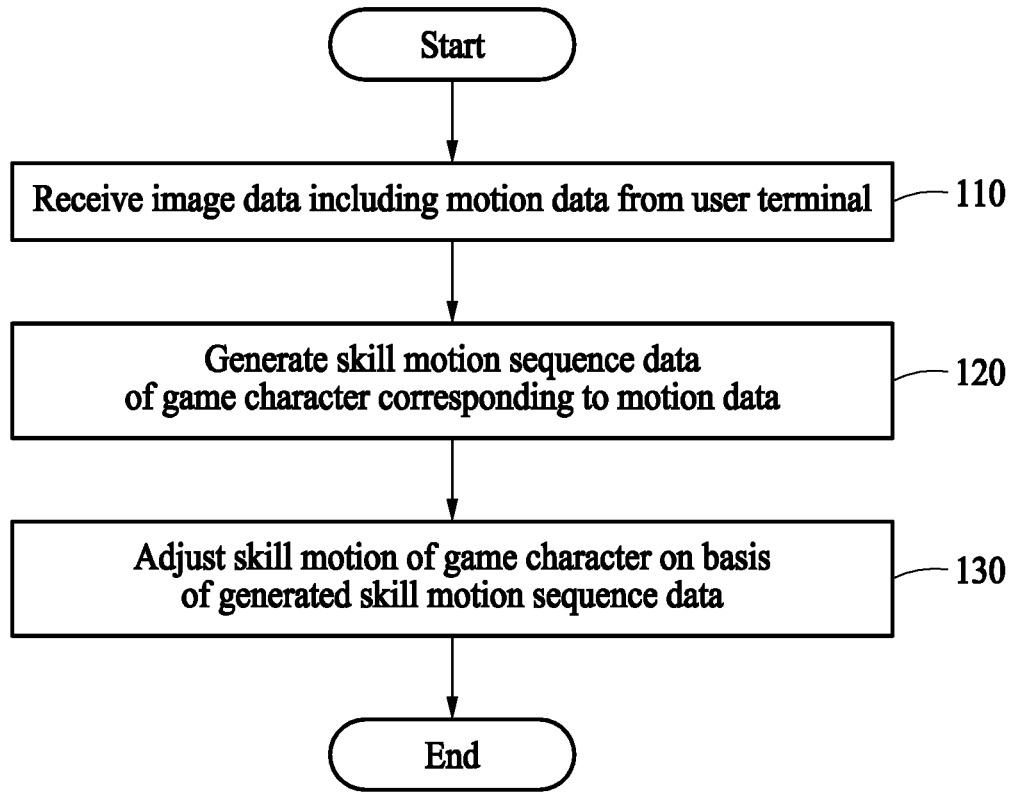
FIG. 1 is a drawing illustrating a method for providing a game service according to an embodiment.

Structural or functional descriptions of embodiments are disclosed for the purpose of being merely illustrative and may be modified and executed in various forms. Therefore, the scope of the specification is not limited to specific forms of disclosed embodiments, and includes changes, equivalents, or substitutes included in the described technical scope.

Terms such as "first" and "second" may be used in describing various components, but it should be interpreted that such terms are used only to distinguish one component from the other. For example, a first component may be referred to as a second component, and similarly, a second component may be referred to as a first component.

It will be understood that when a component is referred to as being "coupled with/to" or "connected to" another component, it may be directly coupled with/to or connected to the other component or an intervening component may be present.

The expression of singular number includes the expression of plural number unless clearly intending otherwise in a context. In the specification, it should be understood that terms of 'comprise', 'have', and the like are to designate the existence of a feature disclosed in the specification, a numeral, a step, an input, a constituent element, a part, or a combination thereof, and do not previously exclude a possibility of existence or supplement of one or more other features, numerals, steps, inputs, constituent elements, parts, or combinations thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

When an embodiment may be accomplished in different ways, a function or an operation specified in a particular block may be performed in an order that is different from that illustrated in a flowchart. For example, functions or operations specified in continuous two blocks may be actually substantially simultaneously performed or may be performed in reverse order, according to a related function or operation.

Hereinafter, a description will be given in detail of embodiments with reference to the accompanying drawings. In describing embodiments with reference to the accompanying drawings, the same reference denotations are assigned to the same elements without regard to the drawing denotations, a duplicated description thereof will be omitted.

A game service providing system which provides a customized skill motion of a game character is not limited to a skill motion of a character defined by a developer and may provide an environment in which a game play with a high involvement of a user may proceed through a skill motion generated based on image data generated by the user. The user of a game service may upload image data including motion data to a server and may proceed with a game play through a skill motion of a customized character generated by the server through analysis of the image data. The term 'skill' or 'skill motion' in the specification may be defined as an event performed for a game character to generate a specific game effect in a game play situation.

FIG. 1 is a drawing illustrating a method for providing a game service according to an embodiment.

According to an embodiment, in step 110, a server may receive image data including motion data from a user terminal. For example, the image data may include a video including motion data of any motion entity. A user may upload image data including motion data of his or her own motion entity to the server, but may upload image data including motion data of another motion entity to the server. The motion data may include data on a motion performed by a motion entity. For example, the motion data may include a gesture for a skill of a game character, an action for motion of the game character, or the like.

In step 120, the server may generate skill motion sequence data of a game character corresponding to the motion data. The server may extract a skeleton for an entity of motion data for each frame of the image data and may extract location data of a feature point of the extracted skeleton. Herein, the skeleton may be defined as, for example, a basic kinematic model of a person in 3D animation software technology field. The server may generate skill motion sequence data based on a change in location data of a feature point of the skeleton extracted for each frame. For example, the server may track the development of changes in location data of feature points corresponding to feature points (e.g., tiptoes, fingertips, knees, or the like) of a skeleton for an entity of motion data along frame progress of image data, may generate sequence data for respective feature points based on the tracked data, and may generate skill motion sequence data based on the generated sequence data for the respective feature points.

In step 130, the server may adjust the skill motion of the game character based on the generated skill motion sequence data. For example, as a change in location data of respective feature points of a skeleton for an entity of motion data included in the skill motion sequence data is matched to a skeleton feature point of a game character, a skill motion corresponding to the skill motion sequence data may be implemented through the game character.

According to an embodiment, the server may generate skill motion sequence data based on some image data selected based on a control signal of the user terminal among the received image data. The server may provide the user with a function of editing the image data to generate skill motion sequence data based on image data selected by the user terminal among the image data. For example, when first motion data (running motion), second motion data (jumping motion), and third motion data (standing motion) are included in order in image data uploaded through the user terminal and when a skill motion the user wants to implement is performed through a jump, the user may transmit a control signal for selecting the second motion data to the server via the user terminal and the server may generate skill motion sequence data corresponding to the second motion data (jumping motion) based on the received control signal.

As such, when the generation of the skill motion sequence data is completed, the server may notify the user that the generation of the skill motion sequence data is completed through a push message or a notification function in a game service and may provide the user with a function of previewing the corresponding skill motion sequence data. In the preview, the skill motion sequence data interworks with a character in the game service to be output. The user may identify how the skill motion sequence data will be implemented in a real game service through the preview. When the user likes it, he or she may purchase the skill motion sequence data. According to an embodiment, corresponding other users may also purchase the skill motion sequence data, and a certain reward may be provided to a writer of the corresponding skill motion sequence data depending to purchase performance. When the user who enjoys the game service shares a skill motion of a game character directly created by him or her using a social network service (SNS) or the like, marketing effects for the game service may be created, and an immersion level, an interest level, and a residual rate for the game service of the user may be enhanced because the user is directly involved in the game service.

Figure 2A:
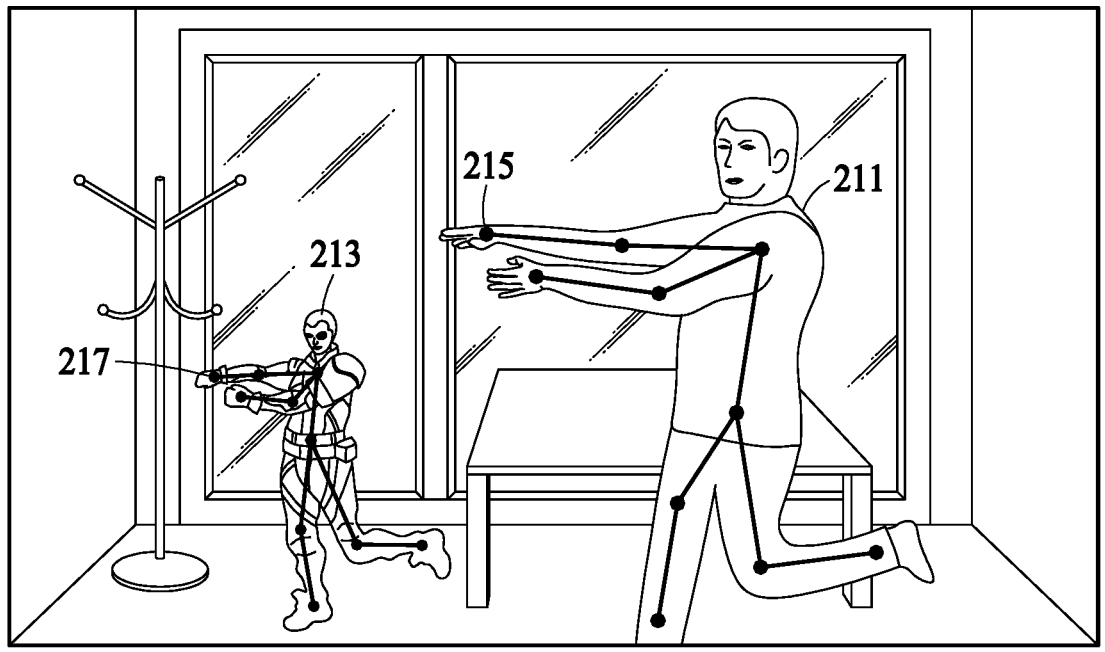
FIG. 2A is a drawing illustrating an example in which a skill motion is applied to a game character based on skill motion sequence data according to an embodiment.

FIG. 2A is a drawing illustrating an example in which a skill motion is applied to a game character based on skill motion sequence data according to an embodiment.

Referring to FIG. 2A, a game character 213 makes the same motion as an entity 211 based on skill motion sequence data generated based on motion data of the entity 211 of the motion data of image data. The skill motion sequence data may be generated by tracking location data of a feature point 215 of a skeleton of the entity 211 along a frame of the image data. As a change in the location data of the feature point 215 included in the skill motion sequence data is applied to a feature point 217 of the game character 213, corresponding to the feature point 215, a skill motion of the game character 213 may be adjusted. The skill motion sequence data may include information about an angle between feature points. The skill motion of the game character 213 may be adjusted by changing an angle of feature points of the game character 213 based on angle information included in the skill motion sequence data.

Figure 2B:
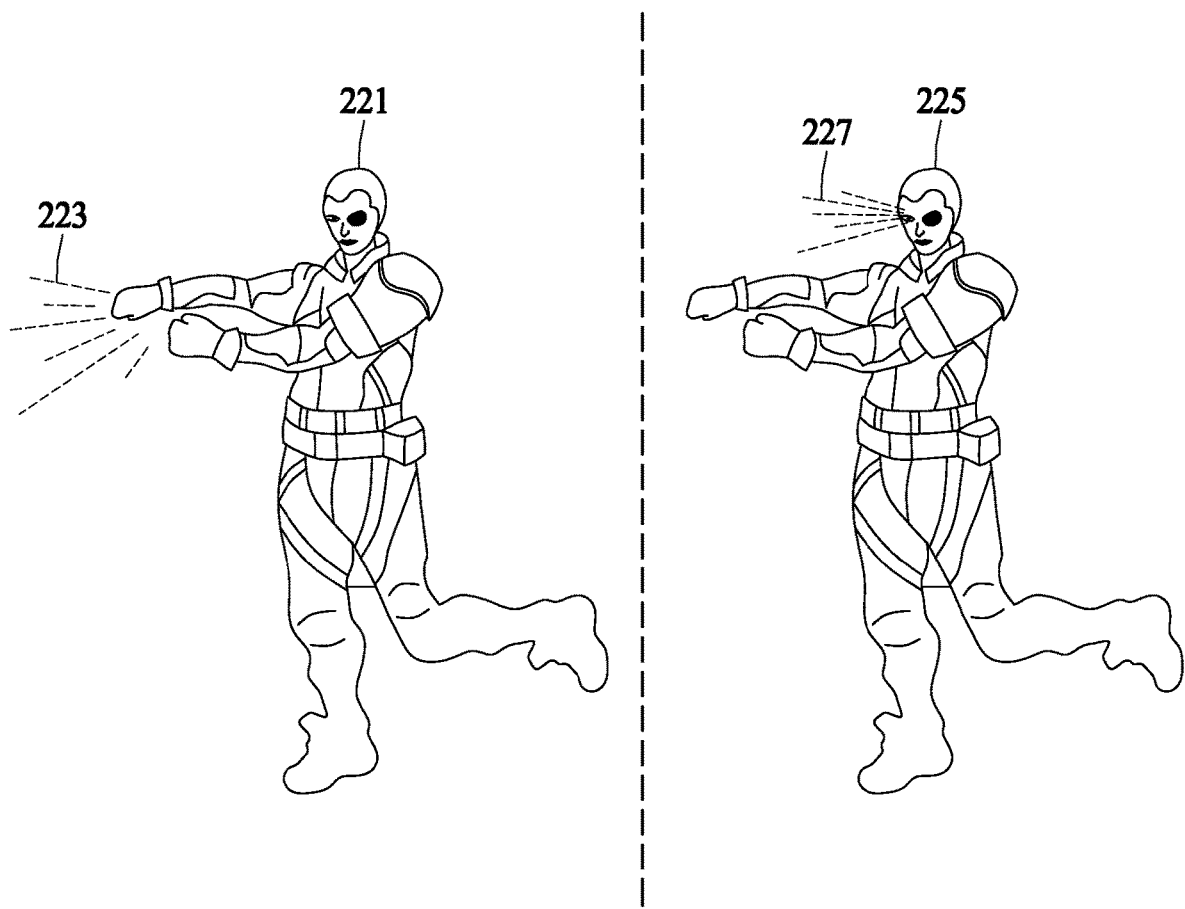
FIG. 2B is a drawing illustrating skill effect data corresponding to a skill motion according to an embodiment.
Figure 2C:
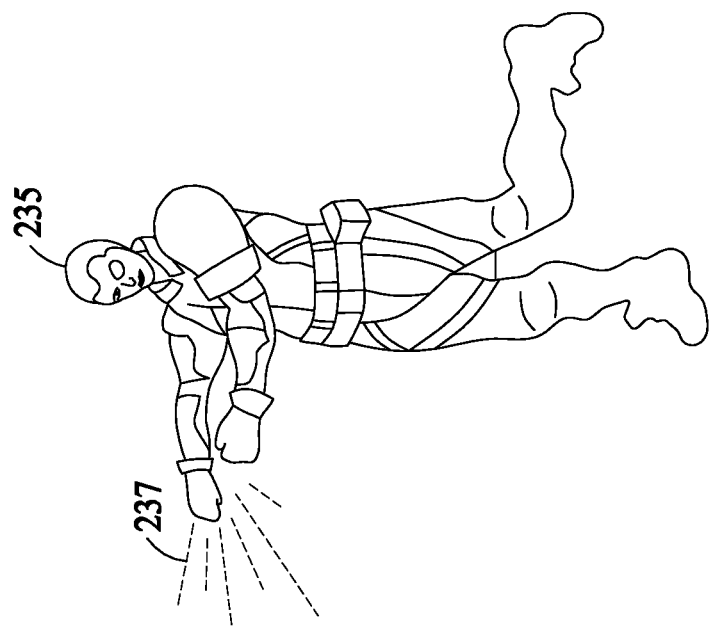
FIG. 2C is a drawing illustrating skill effect data corresponding to a skill motion according to an embodiment.
Figure 2C:
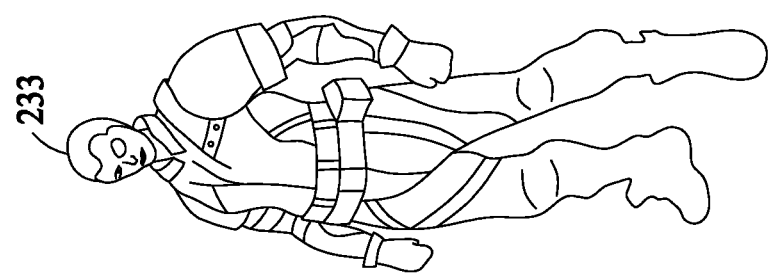
Figure 2C:
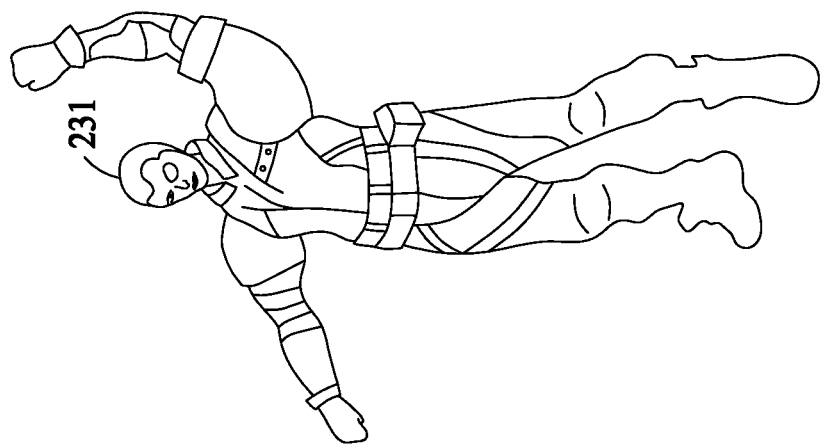

FIGS. 2B and 2C are drawings illustrating skill effect data corresponding to a skill motion according to an embodiment.

The skill effect data refers to an effect corresponding to a skill performed by a game character. For example, when the game character uses a laser attack skill, the skill effect data may include data on a laser beam effect, which corresponds to the skill and is represented in a game service. The skill effect data is not limited to the example given.

According to an embodiment, skill effect data corresponding to a skill motion may include data on a type of a skill effect, data on a time point when the skill effect occurs, or data on a location where the skill effect occurs. Furthermore, skill motion sequence data may further include skill effect data. The skill effect data may be determined based on a control signal of a user terminal. In other words, the skill effect data may be selected through the user terminal by a user.

Referring to FIG. 2B, in a process where a skill motion is adjusted based on skill motion sequence data, a skill effect 223 occurs from a hand of a game character 221. In a process where a skill motion is adjusted based on skill motion sequence data, a skill effect 227 occurs from an eye of a game character 225. The skill effect may occur as an effect defined by a developer with respect to the same skill motion is changed in only location according to game service settings, or the user may determine a type of the skill effect and a location where the skill effect occurs, with respect to the same skill motion through a control signal of the user terminal. For example, various effects, such as a laser beam effect, a flame effect, and a water cannon effect, may be set with respect to the same attack skill motion depending on user selection.

A time point where a skill effect occurs may be adjusted in a game character 231, 233, or 235 based on a control signal of a user terminal, in a process where a skill motion is adjusted based on skill motion sequence data. Referring to FIG. 2C, the game characters 231, 233, and 235 corresponds to arranging the same game characters, which perform skill motions, in order of time. In other words, the game character may perform a skill motion in an order of a motion of the game character 231, a motion of the game character 233, and a motion of the game character 235. A server may determine a time point when a skill effect occurs, based on a control signal of the user terminal. In FIG. 2C shown, a skill effect 237 of an attack occurs at the final time point 235 while the skill motion is performed. The time point when the skill effect occurs may be determined as any time point among time points when the skill motion is performed.

According to an embodiment, the skill motion sequence data may further include speed data of a skill motion. The speed data of the skill motion may be determined based on a control signal of the user terminal. A speed of the skill motion may be basically determined based on a motion speed of an entity on image data. When the user wants to change the speed of the skill motion, he or she may change speed data included in skill motion sequence data through a control signal of the user terminal. The server may adjust a skill motion speed of a game character based on the changed speed data. Furthermore, the speed data of the skill motion may be determined for each interval of the skill motion based on a control signal of the user terminal. In a situation where the skill motion is configured in an order of a first motion interval (walking motion), a second motion interval (running motion), and a third motion interval (jumping motion), when wanting to perform the second operation interval (running motion) in the skill motion faster, the user may change speed information of only a skill motion corresponding to the second motion interval in speed information included in skill motion sequence data through a control signal of the user terminal. The server may adjust such that the second motion of the game character is performed faster, based on the changed speed information.

According to an embodiment, in a step of generating skill motion sequence data, the server may compare motion data included in image data with harmful motion data previously stored in a database and may fail to generate skill motion sequence data for the motion data when the motion data corresponds to the harmful motion data. For example, the server may previously store the harmful motion data including an act considered as a swearword, a lewd act, or the like in the database. When there is motion data matched with the previously stored harmful motion data among motion data included in image data received from the user terminal, the server may fail to generate skill motion sequence data for the matched motion data.

Figure 3:
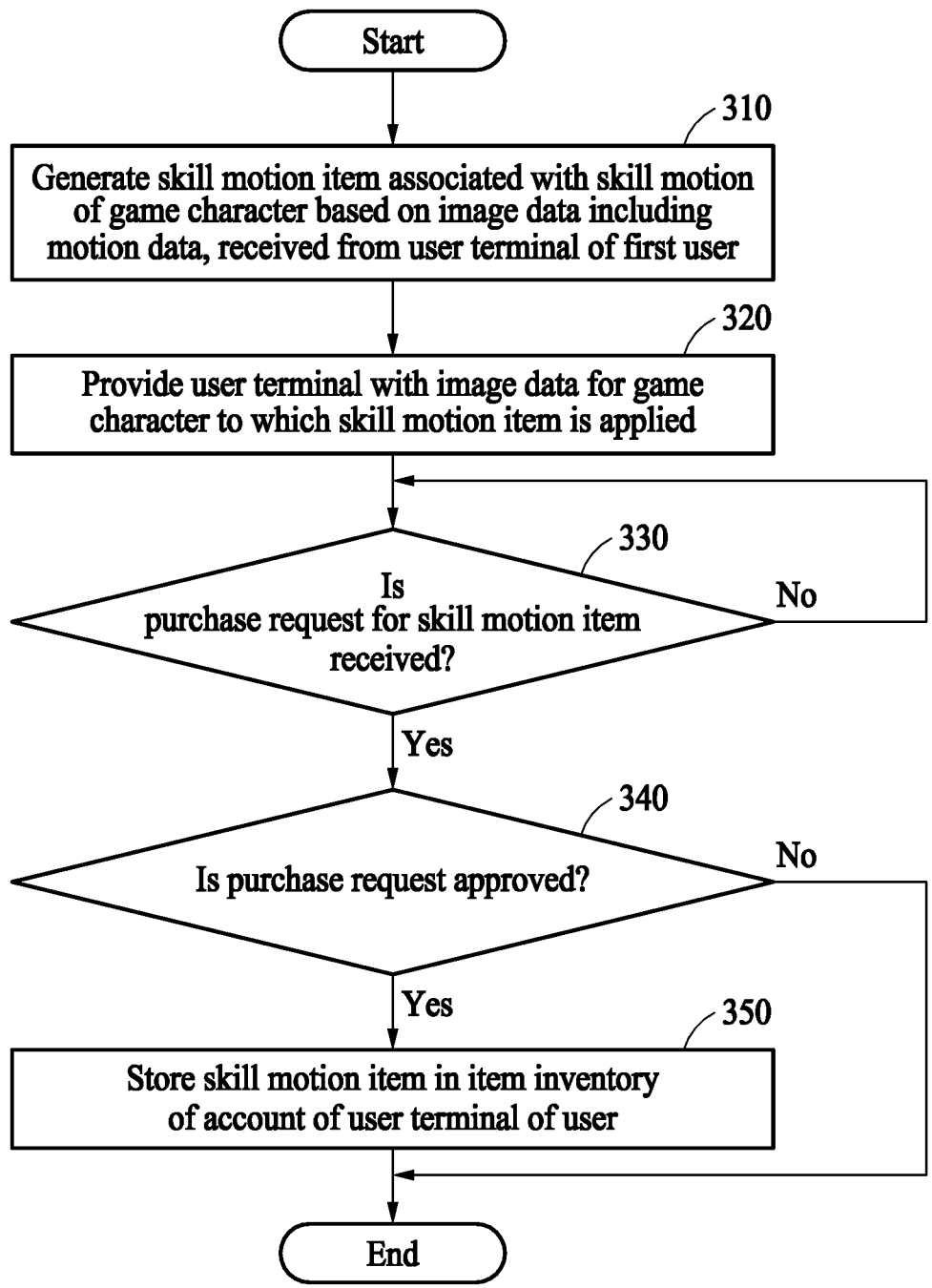
FIG. 3 is a drawing illustrating a method for providing a game service associated with a skill motion item according to an embodiment.

FIG. 3 is a drawing illustrating a method for providing a game service associated with a skill motion item according to an embodiment.

Referring to FIG. 3, in step 310, a server may generate a skill motion item associated with a skill motion of a game character based on image data including motion data, received from a user terminal of a first user. For example, the first user who wants to generate a skill motion item corresponding to motion data included in image data generated by him or her may transmit the image data including the motion data and a request to generate the skill motion item to the server via the user terminal. When the first user requests to generate the skill motion item depending on settings of a game service, the first user may be requested to pay a predetermined amount of money. Receiving the request to generate the skill motion item, the server may generate the skill motion item of the game character based on the motion data included in the image data.

In step 320, the server may provide the user terminal with image data for the game character to which the skill motion item is applied. To provide a preview function for the generated skill motion item, the server may provide the user terminal with the image data for the game character to which the generated skill motion item is applied. The first user may identify the image data generated by the server through the user terminal and may determine whether to finally purchase the skill motion item generated by the server.

When receiving the purchase request for the skill motion item from the user terminal in step 330, in step 340, the server may determine whether to approve the received purchase request. After the first user identifies the image data generated by the server, he or she may determine whether to finally purchase the generated skill motion item. When it is determined to purchase the skill motion item generated by the server, the first user may transmit the purchase request to the server via the user terminal. When receiving the purchase request, the server may determine whether to approve the received purchase request. When the purchase request is approved in step 340, in step 350, the server may store the generated skill motion item in an item inventory of an account of the user terminal of the first user in a game service. The first user may use the skill motion item stored in the item inventory to apply a skill motion corresponding to the skill motion item to the game character.

According to an embodiment, a skill motion item, stored in an item inventory of a first user account after the purchase request is approved as the first user transmits the purchase request for the skill motion item to the server via the user terminal, may then be sold to all users in the game service. For example, after the skill motion item generated based on the image data of the first user is purchased by the first user, the same skill motion item may be sold to another user through an interface of the game service. When the game motion item, which is generated by the request of the first user and proceeds to the purchase approval, is sold through the interface of the game service by a second user, a reward may be provided to the first user who contributes to generating the sold skill motion item. For example, a part of an amount of money corresponding to a price of the sold skill motion item or goods in the game service may be provided to the first user as a reward. Thus, the first user may receive a part of sales revenue of the skill motion item or game money or a specific game item in the game service as a reward. Herein, they are merely illustrative, and a type of the reward provided to the first user is not limited to the example given.

In step 330, when the server does not receive the purchase request for the skill motion item from the user terminal, it may fail to proceed with any additional operation. When the first user identifies the image data generated by the server and determines not to purchase the generated skill motion item, the server may delete the generated skill motion item. When there is an amount of money collected from the first user when the server receives the request to generate the skill motion item, the server may refund the collected amount of money to the first user.

Figure 4:
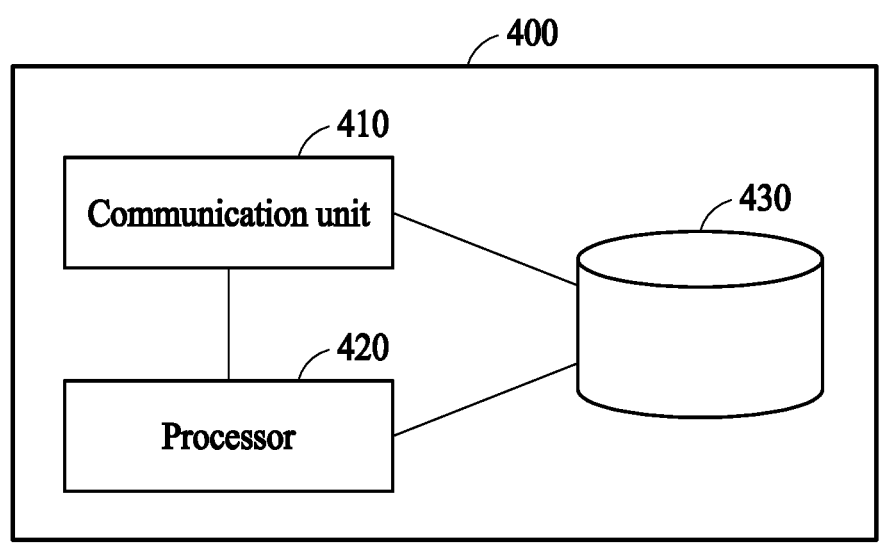
FIG. 4 is a drawing illustrating a game service providing server for providing a skill motion of a customized character according to an embodiment.

FIG. 4 is a drawing illustrating a game service providing server for providing a skill motion of a customized character according to an embodiment.

A game service providing server 400 may include a communication unit 410 for performing communication with a user terminal, a processor 420, and a database 430 for storing various data.

According to an embodiment, the processor 420 may perform one or more operations described in the specification. The processor 420 may receive image data including motion data from the user terminal via the communication unit 410 and may extract a skeleton for an entity of the motion data included in the received image data. The processor 420 may generate skill motion sequence data of a game character based on a change in motion of the extracted skeleton and may provide the user terminal with a game service in which the game character is represented based on the generated skill motion sequence data.

According to an embodiment, the skill motion sequence data may further include skill effect data corresponding to a skill motion. The skill effect data may include at least one of data on a type of a skill effect determined based on a control signal of the user terminal, received via the communication unit 410, data on a time point when the skill effect occurs, or data on a location where the skill effect occurs. Furthermore, the skill motion sequence data may further include speed data of the skill motion. The speed data may be determined based on a control signal of the user terminal.

According to an embodiment, the processor 420 may compare the motion data included in the image data received from the user terminal with harmful motion data previously stored in the database 430. When the motion data included in the image data received from the user terminal and the harmful motion data correspond to each other, the processor 420 may fail to generate skill motion sequence data for the motion data.

According to an embodiment, when receiving a request to generate a skill motion item associated with a skill motion of a game character from a user terminal of a first user via the communication unit 410, the processor 420 may generate a skill motion item based on motion data included in image data received from the user terminal of the first user and may provide image data for a game character to which the skill motion item is applied through a display of the user terminal of the first user. When receiving a purchase request for the skill motion item transmitted via the user terminal by the first user who reviews the image data for the game character to which the skill motion item is applied, the processor 420 may determine whether to approve the purchase request. When the purchase request is approved, the processor 420 may store the skill motion item in an item inventory of an account of the first user. The processor 420 may provide the same item as the skill motion item, the purchase request of which is approved, to all users via an interface of a game service such that all the users of the game service may purchase the same item. When the second user purchases the skill motion item the first user contributes to generating through the interface, the processor 420 may provide the first user with a reward.

Components described in embodiments may be implemented by a hardware component including one or more of programmable logic elements, such as one or more digital signal processors (DSPs), processors, controllers, application specific integrated circuits (ASICs), and field programmable gate arrays (FPGAs), other electronic devices, and a combination thereof. At least some of processes or functions described in embodiments may be implemented by software, and the software may be stored in a storage medium. Components, functions, and processes described in embodiments may be implemented by a combination of hardware and software.

The methods according to the above-described embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described embodiments of the inventive concept, or vice versa.

While embodiments have been shown and described with reference to the accompanying drawings as describe above, it will be apparent to those skilled in the art that various modifications and variations may be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

The invention claimed is:

1. A method for providing a game service in a server, the method comprising:

receiving image data from a first user terminal of a first user, the image data including motion data of the first user performing a skill motion of a game character;

generating a user skill motion item associated with the skill motion of the game character based on the image data including the motion data; providing the first user terminal with image data for the game character to which the skill motion item is applied;

receiving a purchase request for the user skill motion item from the first user terminal; and storing the user skill motion item in an item inventory of an account of the first user terminal on the game service;

wherein, when the skill motion item, the purchase request of which is approved, is sold to a second user, a reward is provided to the first user.

2. The method of claim 1, wherein the game service is configured to provide a marketplace configured to receive a purchase of the user skill motion item.

3. A server for providing a game service, the server comprising:

a processor, wherein the processor receives image data from a first user terminal of a first user, the image data including motion data of the first user performing a skill motion of a game character, extracts a skeleton for the first user from the image data including the motion data, generates user skill motion sequence data of the game character based on a change in motion of the skeleton, provides the game service in which the game character is represented on the first user terminal based on the generated user skill motion sequence data, and generates a user skill motion item associated with the skill motion of the game character based on the image data including the motion data;

wherein, when the user skill motion item is sold to a second user, the processor is further configured to provide the first user with a reward and store the user skill motion item in an item inventory of an account of the second user on the game service.

4. The server of claim 3, wherein the skill motion sequence data further includes skill effect data corresponding to the skill motion, and wherein the skill effect data includes at least one of data on a type of a skill effect determined based on a control signal of the first user terminal, data on a time point when the skill effect occurs, or data on a location where the skill effect occurs.

5. The server of claim 3, wherein the skill motion sequence data further includes speed data of the skill motion, and wherein the speed data is determined based on a control signal of the first user terminal.

6. The server of claim 3, wherein the processor compares the motion data with harmful motion data previously stored in a database and fails to generate skill motion sequence data for the motion data when the motion data corresponds to the harmful motion data.

7. The server of claim 3, wherein the processor further receives receiving a purchase request for the user skill motion item from the first user terminal of the first user and stores the user skill motion item in an item inventory of an account of the first user.

8. The server of claim 7, wherein the processor is configured to provide a marketplace configured to receive a purchase of the skill motion sequence data.

* * * * *